United States Patent
Yang

(10) Patent No.: US 11,412,512 B2
(45) Date of Patent: Aug. 9, 2022

(54) FREQUENCY POINT CONFIGURATION METHOD, NETWORK DEVICE, TERMINAL DEVICE AND COMPUTER STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 109 days.

(21) Appl. No.: 16/928,867

(22) Filed: Jul. 14, 2020

(65) Prior Publication Data

US 2020/0351879 A1 Nov. 5, 2020

Related U.S. Application Data

(63) Continuation of application No. PCT/CN2018/072972, filed on Jan. 17, 2018.

(51) Int. Cl.
*H04W 72/04* (2009.01)
*H04L 5/00* (2006.01)
*H04W 56/00* (2009.01)

(52) U.S. Cl.
CPC ....... *H04W 72/0453* (2013.01); *H04L 5/0053* (2013.01)

(58) Field of Classification Search
CPC ......... H04W 72/0453; H04W 56/0015; H04W 48/16; H04L 5/0053; H04L 5/0058
See application file for complete search history.

(56) References Cited

U.S. PATENT DOCUMENTS

| 8,195,179 B2 | 6/2012 | Queseth | |
|---|---|---|---|
| 2010/0048217 A1* | 2/2010 | Deshpande | H04W 48/16 455/446 |
| 2010/0222060 A1* | 9/2010 | Zhang | H04W 36/0069 455/436 |
| 2010/0227603 A1 | 9/2010 | Gupta | |
| 2011/0009123 A1 | 1/2011 | Queseth | |

(Continued)

FOREIGN PATENT DOCUMENTS

| CN | 101500250 A | 8/2009 |
|---|---|---|
| CN | 101779507 A | 7/2010 |

(Continued)

OTHER PUBLICATIONS

International Search Report in the international application No. PCT/CN2018/072972, dated Oct. 10, 2018.

(Continued)

*Primary Examiner* — Diane L Lo
*Assistant Examiner* — Abusayeed M Haque
(74) *Attorney, Agent, or Firm* — Perkins Coie LLP

(57) ABSTRACT

Provided are a frequency configuration method, a network device, a terminal device and a computer storage medium. The method includes that: when information of a target frequency is added to configuration information, the information of the target frequency is represented by a segment number of the target frequency and a radio frequency channel number (RFCN) corresponding to a segment within which the target frequency is located.

14 Claims, 2 Drawing Sheets

---

Configuration information from a network is received ─ 201

Information of a target frequency is obtained from the configuration information, the target frequency including a segment number of the target frequency and a RFCN corresponding to a segment within which the target frequency is located ─ 202

(56) References Cited

U.S. PATENT DOCUMENTS

| | | | |
|---|---|---|---|
| 2011/0223926 A1* | 9/2011 | Nakao | H04J 11/00 |
| | | | 455/450 |
| 2012/0245883 A1* | 9/2012 | Ben-Eli | H04B 1/16 |
| | | | 702/130 |
| 2013/0229955 A1 | 9/2013 | Xu et al. | |
| 2013/0336199 A1* | 12/2013 | Schwartz | H04W 76/12 |
| | | | 370/315 |
| 2014/0044023 A1 | 2/2014 | Kazmi | |
| 2014/0066057 A1 | 3/2014 | Kazmi et al. | |
| 2015/0105070 A1 | 4/2015 | Kotreka et al. | |
| 2019/0181683 A1* | 6/2019 | Vannucci | H02J 50/70 |
| 2021/0014791 A1* | 1/2021 | Freda | H04W 52/0229 |

FOREIGN PATENT DOCUMENTS

| | | |
|---|---|---|
| CN | 102625348 A | 8/2012 |
| CN | 103260200 A | 8/2013 |
| CN | 103379508 A | 10/2013 |
| CN | 103379588 A | 10/2013 |
| CN | 103858463 A | 6/2014 |
| CN | 105025536 A | 11/2015 |
| CN | 105451239 A | 3/2016 |
| CN | 106658660 A | 5/2017 |
| JP | 2012526407 A | 10/2012 |
| RU | 2595552 C1 | 8/2016 |
| WO | 2010104884 A1 | 9/2010 |

OTHER PUBLICATIONS

Huawei et al. "WF on LTE-NR Coexistence Scenarios with UL Sharing", 3GPP TSG RAN WG1 AH_NR Meeting R1-1701361, issued on Jan. 19, 2017, p. 2.

ZTE Corporation. "Considerations on NR band numbering", 3GPP TSG-RAN WG4 Meeting NR #2 R4-1706639, dated Jun. 19, 2017, section 2.2.

Ericsson. "NR RF channel raster", 3GPP TSG-RAN WG4 meeting #85 R4-1712712, dated Nov. 17, 2017, sections 3-4.

First Office Action of the Chinese application No. 201880002983.9, dated Dec. 25, 2019.

Second Office Action of the Chinese application No. 201880002983.9, dated Feb. 6, 2020.

Decision of Refusal of the Chinese application No. 201880002983.9, dated Apr. 15, 2020.

First Office Action of the Russian application No. 2020126418, dated Mar. 4, 2021.

Office Action of the Indian application No. 202027034870, dated Aug. 26, 2021. 7 pages with English translation.

First Office Action of the European application No. 18900906.1, dated Sep. 8, 2021. 9 pages.

Notice of Allowance of the Russian application No. 2020126418, dated Sep. 27, 2021. 17 pages with English translation.

Supplementary European Search Report in the European application No. 18900906.1, dated Dec. 4, 2020.

Written Opinion of the International Search Authority in the international application No. PCT/CN2018/072972, dated Oct. 10, 2018.

3GPP TS 36.101 V16.4.0 (Dec. 2019), 3rd Generation Partnership Project; Technical Specification Group Radio Access Network; Evolved Universal Terrestrial Radio Access (E-UTRA); User Equipment (UE) radio transmission and reception (Release 16).

Ericsson, NR band numbering [online], 3GPP TSG RAN WG4 adhoc_TSGR4_NR_Jun2017 R4-1706642, Internet<URL:http://www.3gpp.org/ftp/tsg_ran/WG4_Radio/TSGR4_AHs/TSGR4_NR_Jun2017/Docs/R4-1706642.zip>, Jun. 29, 2017. 4 pages.

First Office Action of the Japanese application No. 2020-539063, dated Dec. 24, 2021. 6 pages with English translation.

Second Office Action of the European application No. 18900906.1, dated Feb. 14, 2022. 7 pages.

First Office Action of the Chinese application No. 202011116732.9, dated Apr. 21, 2022. 15 pages with English Translation.

Written Opinion of the Singaporean application No. 11202006819Q, dated Apr. 12, 2022. 7 pages.

* cited by examiner

FREQUENCY POINT CONFIGURATION METHOD, NETWORK DEVICE, TERMINAL DEVICE AND COMPUTER STORAGE MEDIUM

CROSS-REFERENCE TO RELATED APPLICATION

This application is a continuation of International Patent Application No. PCT/CN2018/072972, filed on Jan. 17, 2018, the entire content of which is herein incorporated by reference.

TECHNICAL FIELD

The disclosure relates to the field of communication processing technology, and more particularly to a frequency configuration method, a network device, a terminal device and a computer storage medium.

BACKGROUND

In Long Term Evolution (LTE), Self-Organized Networks (SON) have an Automatic Neighbor Relation (ANR) function. A neighbor relation not configured can be found through a UE measurement report, so that the integrity and effectiveness of a neighbor list can be maintained and abnormal handover between adjacent cells can be reduced, thus improving network performance, avoiding manual operation and reducing cost of operation and maintenance of networks. A neighborhood relationship of intra-LTE and a neighborhood relationship of inter-RAT are included in an LTE ANR neighbor list. With the deployment of New Radio (NR) networks, an NR cell also needs to be maintained in the neighborhood relationship of inter-RAT.

However, a NR cell often has a wide range of frequencies, such as a spectrum range below 6 GHz and above 6 GHz. For the wide spectrum range of NR, if frequency information is represented by the LTE mode, that is, a frequency is represented by an Absolute radio frequency channel number (ARFCN), the numerical value of transmitted configuration information may be very large accordingly.

SUMMARY

The embodiments of the disclosure provide a frequency configuration method, which is applied to a network device and may include:

adding information of a target frequency to configuration information, and representing the information of the target frequency by a segment number of the target frequency and a radio frequency channel number (RFCN) corresponding to a segment within which the target frequency is located.

The embodiments of the disclosure provide a frequency configuration method, which is applied to a terminal device and may include:

receiving configuration information from a network; and obtaining information of a target frequency from the configuration information, the target frequency comprising a segment number of the target frequency and a radio frequency channel number (RFCN) corresponding to a segment within which the target frequency is located.

The embodiments of the disclosure provide a network device, which may include at least one processor configured to add information of a target frequency to configuration information, and represent the information of the target frequency by a segment number of the target frequency and a radio frequency channel number (RFCN) corresponding to a segment within which the target frequency is located.

The embodiments of the disclosure provide a terminal device, which may include a network interface and at least one processor.

The network interface is configured to receive the configuration information from the network.

The at least one processor is configured to obtain information of a target frequency from configuration information, the target frequency including a segment number of the target frequency and a RFCN corresponding to a segment within which the target frequency is located.

The embodiments of the disclosure provide a network device, which may include: a processor and a memory configured to store a computer program capable of running in the processor.

The processor is configured to run the computer program to implement operations of the above method adapted to a network side.

The embodiments of the disclosure provide a terminal device, which may include: a processor and a memory configured to store a computer program capable of running in the processor.

The processor is configured to run the computer program to implement operations of the above method adapted to the terminal device.

The embodiments of the disclosure provide a non-transitory computer storage medium, storing computer-executable instructions that, when executed, can implement operations of the methods above.

The embodiments of the disclosure also provide a computer storage medium. The computer storage medium has stored computer-executable instructions. The computer-executable instructions, when executed, can implement the operations of the above methods.

DETAILED DESCRIPTION

In order to understand characteristics and technical contents in the embodiments of the present disclosure in more detail, the implementation of the embodiments of the disclosure is elaborated in combination with the accompanying drawings. The accompanying drawings are only used for reference, but not intended to limit the embodiments of the disclosure.

Embodiment 1

The embodiments of the disclosure provide a frequency configuration method, which is applied to a network device, includes that:

information of a target frequency is added to configuration information, and a segment number of the target frequency and an RFCN corresponding to a segment within which the target frequency is located frequency is are adopted to represent the information of the target frequency.

Figure 1:
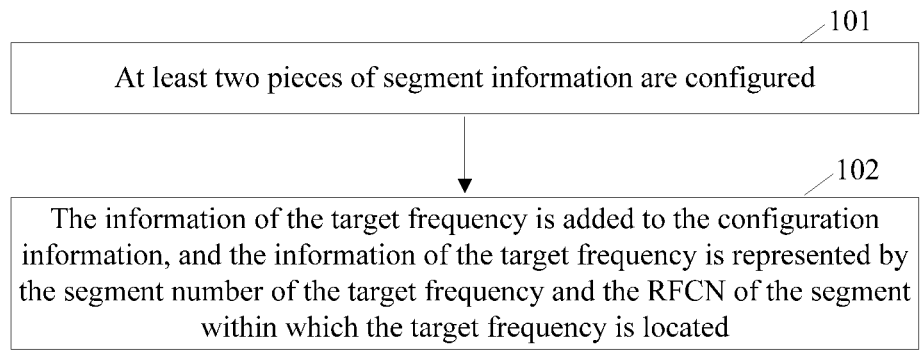
FIG. 1 is flowchart 1 of a frequency configuration method provided by the embodiments of the disclosure.

Specifically, the solutions provided by the present embodiment are described in combination with FIG. 1.

At operation 101, at least two pieces of segment information are configured. The at least two pieces of segment information are the segment information obtained by dividing the entire spectrum, and there is no overlapping band between different pieces of segment information.

At operation 102, the information of the target frequency is added to the configuration information, and the information of the target frequency is represented by the segment number of the target frequency and the RFCN of the segment within which the target frequency is located.

That is, numbering with RFCNs may be performed in segments in the whole spectrum of NR according to the embodiments provided by the disclosure. That is, a serial number of a segment can be indicated, and then a RFCN in the segment can be indicated.

At least two pieces of segment information may be configured based on a protocol or by a high layer, which will not be described in details here. Correspondingly, the at least two pieces of segment information may be sent to the terminal device through system broadcast information so that the terminal device and a network side can obtain the configuration of frequencies based on the same configuration.

Configuring at least two pieces of segment information may further include that:

a segment number is set for each piece of segment information, and number each frequency contained in each piece of segment information by a RFCN.

Specifically, the segment information may have several forms as below.

A first form is that:

two segments are obtained, one with a frequency spectrum above 6 GHz and another with a frequency spectrum below 6 GHz, and segment numbers of the two are 0 and 1 respectively;

numbering is performed in the segment below 6 GHZ to obtain a RFCN corresponding to at least one frequency in this band; and then numbering is performed in the segment above 6 GHZ to obtain a RFCN corresponding to this band.

A second form is that:

grouping is performed based on bands, for example, a group is 1.8G-2.6G, a group is below 3.5G-6G, a group is 6G-20G, a group is 20G-30G, and a group is a millimeter wave, etc.; then, at least one frequency within a spectrum range of each group is numbered by a RFCN.

That is, with the solutions provided in the present embodiment, when a frequency needs to be represented in the configuration information, it may be represented by a segment number and a RFCN corresponding to a spectrum range of the segment number.

It is apparent that based on the above solutions, information of a target frequency can be represented by a segment number of the target frequency and a RFCN corresponding to the segment within which the target frequency is located. Thus, when the configuration information containing the information of the target frequency is transmitted, the number of transmission bits or transmission space representing the information of the frequency can be reduced, thereby reducing a signaling load.

Embodiment 2

Figure 2:
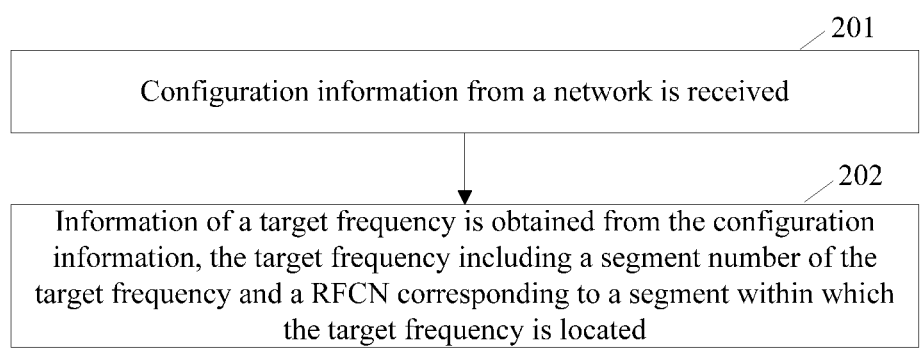
FIG. 2 is flowchart 2 of a frequency configuration method provided by the embodiments of the disclosure.

The embodiments of the disclosure provide a frequency configuration method, which is applied to a terminal device. As shown in FIG. 2, the method may include the following operations.

At operation 201, configuration information from a network is received.

At operation 202, information of a target frequency is obtained from the configuration information, the target frequency including a segment number of the target frequency and a RFCN corresponding to a segment within which the target frequency is located.

That is, numbering is performed in segments in the whole spectrum of NR by RFCNs according to the embodiments provided by the disclosure. That is, a serial number of a segment is indicated first, and then a RFCN corresponding to the segment is indicated.

The method may further include that:

at least two pieces of segment information are determined based on a protocol; or, at least two pieces of segment information configured by the network are obtained through system broadcast information.

The at least two pieces of segment information may be sent to the terminal device through system broadcast information, so that the terminal device and the network can obtain the configuration of frequencies based on the same configuration.

The at least two pieces of segment information may include a spectrum range corresponding to each piece of segment information and a segment number of the spectrum range, and include each RFCN corresponding to each frequency contained in each piece of segment information.

Specifically, the segment information may have several forms below.

A First Form two segments are obtained, one with a frequency spectrum above 6 GHz and another with a frequency spectrum below 6 GHz, and segment numbers of the two are 0 and 1 respectively;

numbering is performed in the segment below 6 GHZ to obtain a RFCN corresponding to at least one frequency in this band; and then numbering is performed in the segment above 6 GHZ to obtain a RFCN corresponding to this band.

A second form is that:

grouping is performed based on bands, for example, a group is 1.8G-2.6G, a group is below 3.5G-6G, a group is 6G-20G, a group is 20G-30G, and a group is a millimeter wave, etc.; then, at least one frequency within a spectrum range of each group is numbered by a RFCN.

That is, with the solutions provided in the present embodiment, when a frequency needs to be represented in the configuration information, it may be represented by a segment number and a RFCN corresponding to a spectrum range of the segment number.

It is apparent that based on the above solutions, information of a target frequency can be represented by a segment number of the target frequency and a RFCN corresponding to the segment within which the target frequency is located. Thus, when the configuration information containing the information of the target frequency is transmitted, the number of transmission bits or transmission space representing the information of the frequency can be reduced, thereby reducing a signaling load.

Embodiment 3

Figure 3:
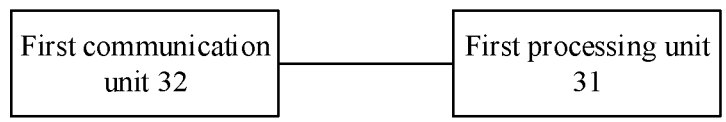
FIG. 3 is a structure diagram of a network device according to an embodiment of the disclosure.

The embodiments of the disclosure provide a network device, as shown in FIG. 3, which may include a first processing unit 31.

The first processing unit 31 is configured to add information of a target frequency to configuration information, and represent the information of the target frequency by a segment number of the target frequency and a RFCN corresponding to the segment within which the target frequency is located.

The first processing unit 31 is configured to configure at least two pieces of segment information. The at least two pieces of segment information are the segment information obtained by dividing the entire spectrum, and there is no overlapping band between different pieces of segment information.

That is, numbering with RFCNs may be performed in segments in the whole spectrum of NR according to the embodiments provided by the disclosure. That is, a serial number of a segment can be indicated, and then a RFCN in the segment can be indicated.

At least two pieces of segment information may be configured based on a protocol or by a high layer, which will not be described in details here. Correspondingly, the network device may further include a first communication unit 32.

The first communication unit 32 is configured to send configuration of the at least two pieces of segment information to the terminal device through system broadcast information, so that the terminal device and the network side can obtain the configuration of frequencies based on the same configuration.

For configuring at least two pieces of segment information, the first processing unit 31 is configured to set a segment number for each piece of segment information, and number each frequency contained in each piece of segment information by a RFCN.

Specifically, the segment information may have several forms as below.

A first form is that:

two segments are obtained, one with a frequency spectrum above 6 GHz and another with a frequency spectrum below 6 GHz, and segment numbers of the two are 0 and 1 respectively;

numbering is performed in the segment below 6 GHZ to obtain a RFCN corresponding to at least one frequency in this band; and then numbering is performed in the segment above 6 GHZ to obtain a RFCN corresponding to this band.

A second form is that:

grouping is performed based on bands, for example, a group is 1.8G-2.6G, a group is below 3.5G-6G, a group is 6G-20G, a group is 20G-30G, and a group is a millimeter wave, etc.; then, at least one frequency within a spectrum range of each group is numbered by a RFCN.

That is, with the solutions provided in the present embodiment, when a frequency needs to be represented in the configuration information, it may be represented by a segment number and a RFCN corresponding to a spectrum range of the segment number.

It is apparent that based on the above solutions, information of a target frequency can be represented by a segment number of the target frequency and a RFCN corresponding to the segment within which the target frequency is located. Thus, when the configuration information containing the information of the target frequency is transmitted, the number of transmission bits or transmission space representing the information of the frequency can be reduced, thereby reducing a signaling load.

Embodiment 4

Figure 4:
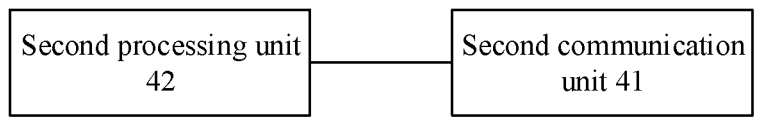
FIG. 4 is a structure diagram of a terminal device according to an embodiment of the disclosure.

The embodiments of the disclosure provide a terminal device, as shown in FIG. 4, which may include a second communication unit 41 and a second processing unit 42.

The second communication unit 41 is configured to receive configuration information from a network.

The second processing unit 42 is configured to obtain information of a target frequency from the configuration information, the target frequency including a segment number of the target frequency and a RFCN corresponding to a segment within which the target frequency is located.

That is, numbering is performed in segments in the whole spectrum of NR by RFCNs according to the embodiments provided by the disclosure. That is, a serial number of a segment is indicated first, and then a RFCN corresponding to the segment is indicated.

The second processing unit 42 is configured to determine at least two pieces of segment information based on a protocol; or, the second communication unit 41 is configured to obtain at least two pieces of segment information configured by the network through system broadcast information.

The at least two pieces of segment information may also be sent to the terminal device through system broadcast information so that the terminal device and the network can obtain the configuration of frequencies based on the same configuration.

The at least two pieces of segment information may include a spectrum range corresponding to each piece of segment information and a segment number of the spectrum range, and include each RFCN corresponding to each frequency contained in each piece of segment information.

Specifically, the segment information may have several forms below.

A First Form

A First Form two segments are obtained, one with a frequency spectrum above 6 GHz and another with a frequency spectrum below 6 GHz, and segment numbers of the two are 0 and 1 respectively;

numbering is performed in the segment below 6 GHZ to obtain a RFCN corresponding to at least one frequency in this band; and then numbering is performed in the segment above 6 GHZ to obtain a RFCN corresponding to this band.

A second form is that:

grouping is performed based on bands, for example, a group is 1.8G-2.6G, a group is below 3.5G-6G, a group is 6G-20G, a group is 20G-30G, and a group is a millimeter wave, etc.; then, at least one frequency within a spectrum range of each group is numbered by a RFCN.

That is, with the solutions provided in the present embodiment, when a frequency needs to be represented in the configuration information, it may be represented by a segment number and a RFCN corresponding to a spectrum range of the segment number.

It is apparent that based on the above solutions, information of a target frequency can be represented by a segment number of the target frequency and a RFCN corresponding to the segment within which the target frequency is located. Thus, when the configuration information containing the information of the target frequency is transmitted, the number of transmission bits or transmission space representing the information of the frequency can be reduced, thereby reducing a signaling load.

Figure 5:
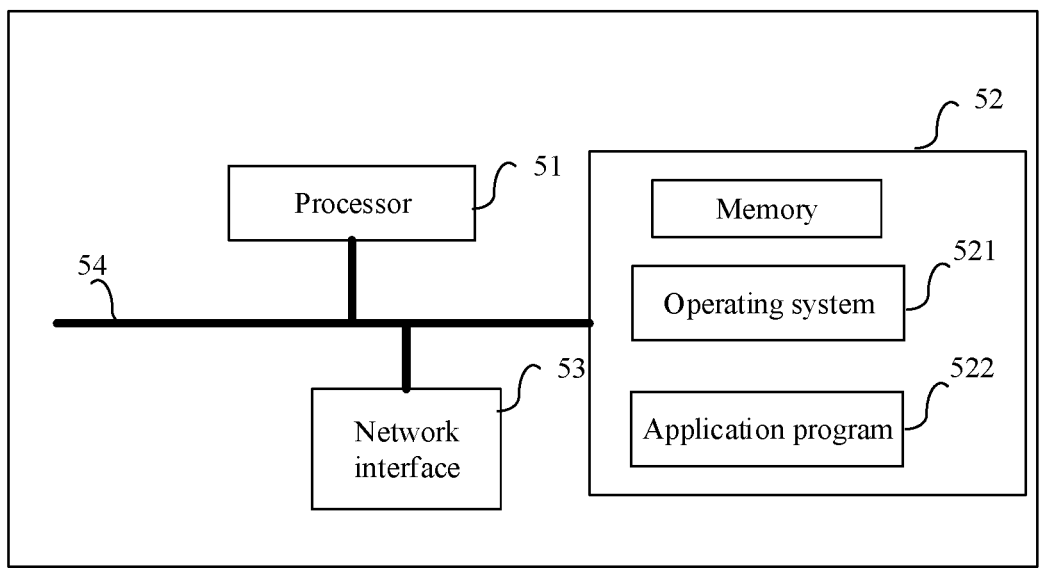
FIG. 5 is a schematic diagram of a hardware architecture according to an embodiment of the disclosure.

The embodiments of the disclosure also provide a hardware composition architecture of a network device or a terminal device, as shown in FIG. 5, which includes at least one processor 51, a memory 52 and at least one network interface 53. Each component is coupled together through a bus system 54. It may be understood that the bus system 54 is configured to implement connection communication among these components. The bus system 54 includes a data bus and further includes a power bus, a control bus and a state signal bus. However, for clear description, various buses in FIG. 5 are marked as the bus system 54.

It may be understood that the memory 52 in the embodiment of the disclosure may be a volatile memory or a nonvolatile memory, or may include both the volatile and nonvolatile memories.

In some implementation modes, the memory 52 is configured to store the following elements, executable modules or data structures, or a subset thereof or an extended set thereof:

an operating system 521 and an application program 522.

The processor 51 is capable of processing the operations of the method in embodiment 1, and elaborations are omitted herein.

The embodiments of the disclosure provide a computer storage medium, which has stored computer-executable instructions, the computer-executable instruction being executed to implement the operations of the method of embodiment 1.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Based on the technical solutions of the embodiments of the disclosure, information of a target frequency can be represented by a segment number of the target frequency and a RFCN of a segment within which the target frequency is located. Thus, when the configuration information containing the information of the target frequency is transmitted, the number of transmission bits or transmission space representing the information of the frequency can be reduced, thereby reducing a signaling load.

Although the preferred embodiments of the disclosure have been disclosed for the exemplary purposes, those skilled in the art may realize that it is also possible to make various improvements, additions and replacements. Therefore, the scope of the disclosure should not be limited to the above embodiments.

The invention claimed is:

1. A frequency configuration method, applied to a network device, the method comprising:
adding information of a target frequency to configuration information, and
representing the information of the target frequency by a segment number of the target frequency and a radio frequency channel number (RFCN) corresponding to a segment within which the target frequency is located;
wherein the method further comprises:
configuring at least two pieces of segment information, wherein the at least two pieces of segment information are obtained by dividing an entire spectrum; and
determining the at least two pieces of segment information based on a protocol.

2. The method of claim 1, wherein there is no overlapping band between different pieces of segment information.

3. The method of claim 1, further comprising:
sending configuration of the at least two pieces of segment information to a terminal device through system broadcast information.

4. The method of claim 1, wherein after configuring the at least two pieces of segment information, the further comprises:
setting a corresponding segment number for each piece of segment information, and
numbering each frequency contained in each piece of segment information by a RFCN.

5. A network device, comprising:
at least one processor, configured to implement the operation of the method of claim 1.

6. The network device of claim 5, wherein there is no overlapping band between different pieces of segment information.

7. The network device of claim 5, further comprising:
a network interface, connected to the at least one processor and configured to send configuration of the at least two pieces of segment information to a terminal device through system broadcast information.

8. The network device of claim 5, wherein the at least one processor is configured to set a corresponding segment number for each piece of segment information, and number each frequency contained in each piece of segment information by a RFCN.

9. A non-transitory computer storage medium, storing computer-executable instructions that, when executed, implement operations of the method of claim 1.

10. A frequency configuration method, applied to a terminal device, the method comprising:
receiving configuration information from a network device; and
obtaining information of a target frequency from the configuration information, the target frequency comprising a segment number of the target frequency and a radio frequency channel number (RFCN) corresponding to a segment within which the target frequency is located;
wherein the method further comprises:
obtaining, through system broadcast information, at least two pieces of segment information configured at the network device; wherein the at least two pieces of segment information are obtained by the network device by dividing an entire spectrum, and the at least two pieces of segment information are determined by the network device based on a protocol.

11. The method of claim 10, wherein the at least two pieces of segment information comprise a spectrum range of each piece of segment information and a segment number of the spectrum range, and comprise a RFCN of each frequency contained in each piece of segment information.

12. A non-transitory computer storage medium, storing computer-executable instructions that, when executed, implement operations of the method of claim 10.

13. A terminal device, comprising:

a network interface, configured to receive configuration information from a network device; and at least one processor, connected to the network interface and configured to obtain information of a target frequency from the configuration information, the target frequency comprising a segment number of the target frequency and a radio frequency channel number (RFCN) corresponding to a segment within which the target frequency is located;

wherein the at least one processor is further configured to:

obtain, through system broadcast information, at least two pieces of segment information configured at the network device; wherein the at least two pieces of segment information are obtained by the network device by dividing an entire spectrum, and the at least two pieces of segment information are determined by the network device based on a protocol.

14. The terminal device of claim 13, wherein the at least two pieces of segment information comprise a spectrum range of each piece of segment information and a segment number of the spectrum range, and comprise a RFCN of each frequency contained in each piece of segment information.

* * * * *